United States Patent [19]
Herz et al.

[11] Patent Number: 5,883,675
[45] Date of Patent: Mar. 16, 1999

[54] CLOSED CAPTIONING PROCESSING ARCHITECTURE FOR PROVIDING TEXT DATA DURING MULTIPLE FIELDS OF A VIDEO FRAME

[75] Inventors: William S. Herz, Newark; Sunil S. Mahajan, Sunnyvale, both of Calif.

[73] Assignee: S3 Incorporated, Santa Clara, Calif.

[21] Appl. No.: 676,527

[22] Filed: Jul. 9, 1996

[51] Int. Cl.[6] .................................................. H04N 7/08
[52] U.S. Cl. ........................ 348/465; 348/467; 348/468
[58] Field of Search .................................. 345/302, 113, 345/114, 115, 116, 124, 154, 327; 348/464, 465, 467, 468, 473, 476, 478, 525, 555, 563

[56] References Cited

U.S. PATENT DOCUMENTS

| | | | |
|---|---|---|---|
| 5,438,370 | 8/1995 | Primiano et al. | 348/476 |
| 5,499,060 | 3/1996 | Gove et al. | 348/651 |
| 5,519,450 | 5/1996 | Urbanus et al. | 348/600 |
| 5,543,850 | 8/1996 | Pratt et al. | 348/617 |
| 5,557,302 | 9/1996 | Levinthal et al. | 345/509 |
| 5,610,665 | 3/1997 | Berman | 348/564 |
| 5,615,131 | 3/1997 | Mortensen et al. | 395/200.36 |
| 5,648,824 | 7/1997 | Dunn et al. | 348/734 |
| 5,666,548 | 9/1997 | Grimm et al. | 395/800.1 |
| 5,671,019 | 9/1997 | Isoe et al. | 348/565 |
| 5,701,161 | 12/1997 | Williams et al. | 348/468 |
| 5,708,475 | 1/1998 | Hayashi et al. | 348/468 |

*Primary Examiner*—Stephen S. Hong
*Attorney, Agent, or Firm*—Fenwick & West LLP

[57] ABSTRACT

A graphics display system processes a video signal that includes closed caption text. A digitizer and decoder circuit retrieves the closed caption data and formats the data to avoid loss by decimation, to be scalable, and to include an indicator of capture or display. The digitizer and decoder circuit includes ping pong buffers for storing the data. During a first odd field, the closed caption data is stored in the ping buffer and the closed caption data from a previous field is read from the pong buffer. During the even field, the closed caption data is again read from the pong buffer. During the next odd field, the operation is repeated with the functions of the ping and pong buffers reversed. Alternatively the even field may contain the closed caption data. The digitizer and decoder circuit includes a capture or display valid bit in the closed caption data to indicate that the caption data is from the current field. The formatted data and a vertical synchronization signal are provided to a graphics user interface (GUI) accelerator which stores the data in a frame buffer or on disk. Response to the vertical synchronization signal, the GUI accelerator generates an interrupt that is serviced by the host processor which controls the reading and display of the caption data.

26 Claims, 9 Drawing Sheets

| BYTE 0 306 | PART OF BYTE 1 308 | 310 | PART OF BYTE 1 312 | 314 | PART OF BYTE 1 316 | 318 | PART OF BYTE 1 320 |
|---|---|---|---|---|---|---|---|
| DISPLAY VALID BIT | CAPTURE VALID BIT | DISPLAY VALID BIT | BIT 5 | DISPLAY VALID BIT | BIT 3 | DISPLAY VALID BIT | BIT 1 |
| BIT 6 | BIT 6 | BIT 6 | BIT 4 | BIT 6 | BIT 2 | BIT 6 | BIT 0 |
| BIT 5 | VALID BIT | BIT 5 | BIT 5 | BIT 5 | BIT 3 | BIT 5 | BIT 1 |
| BIT 4 | BIT 6 | BIT 4 | BIT 4 | BIT 4 | BIT 2 | BIT 4 | BIT 0 |
| BIT 3 | x | BIT 3 | x | BIT 3 | x | BIT 3 | x |
| BIT 2 | x | BIT 2 | x | BIT 2 | x | BIT 2 | x |
| BIT 1 | x | BIT 1 | x | BIT 1 | x | BIT 1 | x |
| BIT 0 | x | BIT 0 | x | BIT 0 | x | BIT 0 | x |

*FIG. 3B*

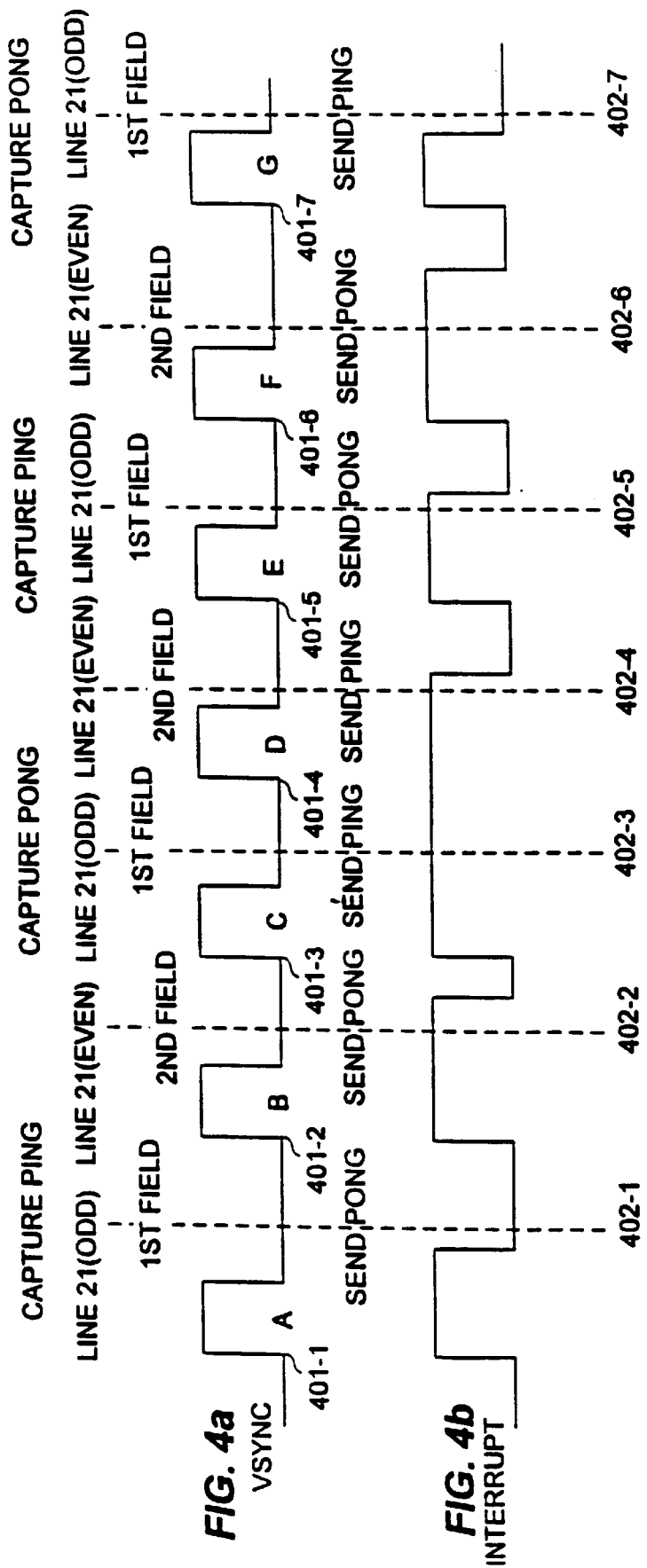

CLOSED CAPTIONING PROCESSING ARCHITECTURE FOR PROVIDING TEXT DATA DURING MULTIPLE FIELDS OF A VIDEO FRAME

FIELD OF THE INVENTION

The invention relates to processing video data, and more particularly relates to processing closed captioning data in a graphics system.

BACKGROUND OF THE INVENTION

Video data frequently includes data, such as closed caption text data, that is transmitted during the vertical blanking interval (VBI). The closed caption text data is typically transmitted during line 21 of either the odd or even field of the video frame in a National Television Standards Committee (NTSC) format. Closed caption decoders strip the encoded text data from the video signal, decode the text data, and reformat the data for display, concurrent with the video data, on a television screen. Such closed caption decoders process the text data separately from a video signal.

It is desired to have a multimedia system or a PC system that digitally processes and displays both graphics and video data. It is desired to have the GUI accelerator process and store or display the closed caption data in a manner similar to the processing and storing processing of video data.

SUMMARY OF THE INVENTION

In the present invention, a method decodes and processes text data or closed caption data in a video signal. Closed caption data in a first video field is detected. The detected closed caption data in the first video field is retrieved. During the first video field, stored closed caption data in a previous video field is retrieved. During a second video field, the stored closed caption data in the previous video field is retrieved. An indicator to the transmitted closed caption data indicative of whether the closed caption data is valid is added. The indicator further is indicative of whether the closed caption data is to be displayed. The indicator may be further indicative of whether the closed caption data is to be captured. The transmitted closed caption data is unscaled.

A graphics display system includes a graphics display and a frame buffer for storing graphics data and text data. The graphics display system also includes a digital video decoder and a GUI accelerator. The decoder receives an analog video signal containing text data, and in response thereto, provides graphics data and text data extracted from the analog video signal to the GUI accelerator. The GUI accelerator provides graphics data and text data to the graphics display and provides the video data and the text data to the frame buffer. The analog video signal contains the text data in a line of a vertical blanking interval of a field. The graphics display system may also include a storage medium for capturing the text data. A digitizer and decoder circuit for processing text data encoded in a video signal, includes a detector for providing a text data indicator signal having a first logic state indicative of the occurrence of the text data and having a second logic state indicative of the no text data. A first memory or buffer stores text data from one field of a first frame of the video signal. A second memory or buffer stores text data from one field of a second frame of the video signal. A processor coupled to the first and second memories and to the detector provides the video signal in response to the text data indicator signal being in the second logic state and alternately provides the stored text data in the first and second memories responsive to the text data indicator signal being in the first logic state.

The processor retrieves the stored text data in the first memory during both fields of the second frame and provides the stored text data in the second memory during both fields of the first frame. The processor adds an indicator to the text data indicative of whether the text data is valid. The indicator may be further indicative of whether the text data is to be displayed or captured.

A graphics display system includes a graphics display and a digital-to-analog converter coupled to the graphics display for generating an analog graphics signal responsive to a digital graphics signal. A GUI accelerator coupled to the digital graphics signal provides the digital graphics signal to the digital-to-analog converter and provides a digital video signal to a frame buffer. A digitizer and decoder circuit coupled to the GUI accelerator receives an analog video signal containing closed caption text, generates a digital video signal that includes closed caption text, stores closed caption text from a first field of a current frame of the video signal and provides the closed caption text of a previous frame, during first and second fields of the current frame. The digitizer and decoder circuit adds an indicator to the text data indicative of whether the text data is valid and whether the text data is to be displayed or captured. A disk coupled to the GUI accelerator stores the text data if the indicator indicates that the text data is to be captured.

DESCRIPTION OF THE DRAWINGS

FIGS. 3a–3b are block diagrams illustrating the format of data YUV 4:2:2 and 4:1:1 embodiments, respectively.

FIGS. 4a–4b are timing diagrams illustrating the timing of a vertical synchronization signal and an interrupt, respectively.

DETAILED DESCRIPTION OF THE PREFERRED EMBODIMENT

Figure 1:
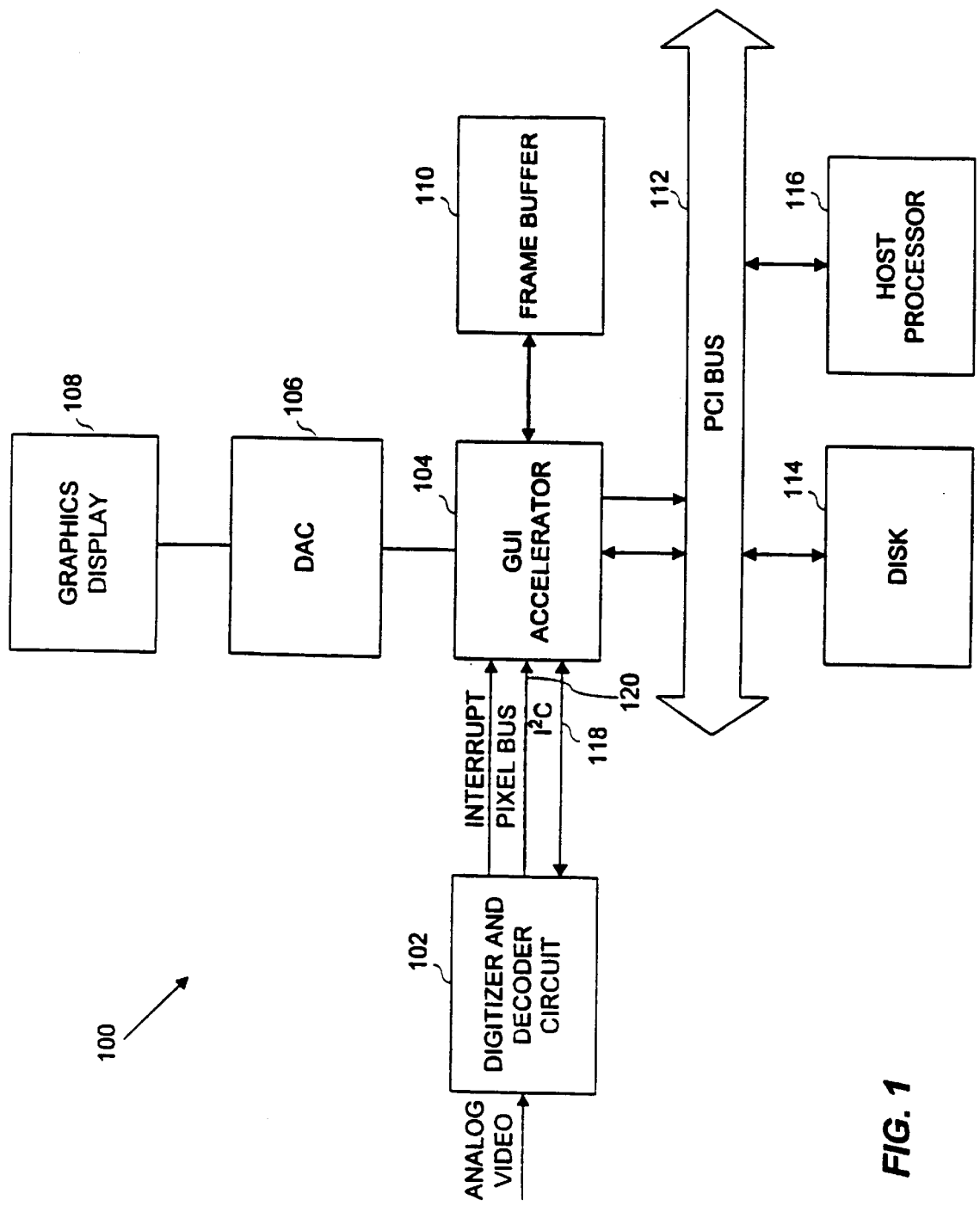
FIG. 1 is a block diagram illustrating a graphics display system.

Referring to FIG. 1, there is shown a block diagram illustrating a graphics display system 100, which includes a digitizer and decoder circuit 102, a graphical user interface (GUI) accelerator 104, a digital-to-analog converter (DAC) 106, a graphics display 108, a frame buffer 110, a bus 112, a disk 114, a host processor 116, an I$^2$C bus 118, and a pixel bus 120. The bus 112 may be, for example, a Peripheral Components Interconnection (PCI) bus. The graphics display system 100 processes video signals and retrieves and processes text data or closed caption data from the video signals. For simplicity and clarity, the graphics display system 100 is described herein as processing closed caption data. However the system 100 may also process text data in the video signals or vertical blanking interval (VBI).

In a first mode of operation, the decoded closed caption data is stored into a register (register 228 of FIG. 2) in the digitizer and decoder circuit 102, and the GUI accelerator 104 reads the stored closed caption data through the I²C bus 118, which provides bi-directional communication between the GUI accelerator 104 and the digitizer and decoder circuit 102. The I²C bus 118 is a bus with a Philips protocol which is well known. The GUI accelerator 104 serves as an I²C bus master. This first mode of operation is well known and understood. In a second mode of operation, the host processor 116 controls the GUI accelerator 104 to capture the closed caption data using the frame buffer 110.

In the second mode of operation, the digitizer and decoder circuit 102 extracts the text data from the video signal. The video signal otherwise is processed and formatted in a conventional manner, which may include scaling or other data manipulation. The digitizer and decoder circuit 102 stores the text data for the current frame and provides the text data for the previous frame to the GUI accelerator 104 via the pixel bus 120. The digitizer and decoder circuit 102 formats the text data so that the GUI accelerator 104 traffics the text data along with the video signal without loss of content. The digitizer and decoder circuit 102 also includes a identifier indicating whether the text data is to be captured in the disk or displayed on the display. The identifier is preferably either a capture valid bit or a display valid bit.

In response to commands from the host processor 116, the GUI accelerator 104 receives video and text data from the digitizer and decoder circuit 102 via a pixel bus 120, stores the data in the frame buffer 110, and generates graphics data from the data from the digitizer and decoder circuit 102 or from the frame buffer 110. The host processor 116 may be, for example, a Pentium (TM) type processor manufactured by Intel Corporation of Santa Clara, California. The GUI accelerator 104 may be, for example, a conventional GUI accelerator having a video pixel bus input, such as a model 86C968 GUI accelerator manufactured by S3, Inc. of Santa Clara, Calif. The frame buffer 110 may be, for example, a conventional video random access memory (VRAM). The size of the frame buffer 110 depends on the resolution and the format of both the video data and the graphics data.

The GUI accelerator 104 generates a vertical synchronization (Vsync) interrupt in response to the vertical synchronization (Vsync) signal in the video signal received from the digitizer and decoder circuit 102. The host processor 116 services the Vsync interrupt by executing an interrupt servicing routine, described below. The host processor 116 uses the Vsync interrupt to determine the timing of the line containing the closed-caption data and then reads such line from the frame buffer 110. The description herein describes the line containing the closed-caption data as line 21. However, the present invention is not limited to line 21. In addition, the data may be text data or other digital data encoded on video lines.

As described below in conjunction with FIG. 4, the latency of the Vsync interrupt is unpredictable. In particular, there is a time difference between the Vsync interrupt and the occurrence of the closed caption data on line 21 which is not necessarily predeterminable by the host processor 116, which reads the closed caption data from the frame buffer 110. To ensure that the host processor 116 reads the proper data, the digitizer and decoder circuit 102 buffers the data for one field and resends the closed caption data in the next field. In addition, the data from the digitizer and decoder circuit 102 includes a valid bit indicative of whether the data of line 21 stored in the frame buffer 110 is valid closed-caption data that was not previously read as an interrupt was successfully serviced. The host processor 116 also resets the valid bit via the I²C bus 118 after the text data is processed.

The digital-to-analog converter 106 transforms the digital data from the GUI accelerator 104 into a display format for displaying on the display 108. The digital-to-analog converter 106 may be, for example, a DAC485 manufactured by Brooktree. The display 108 is a conventional display.

Figure 2:
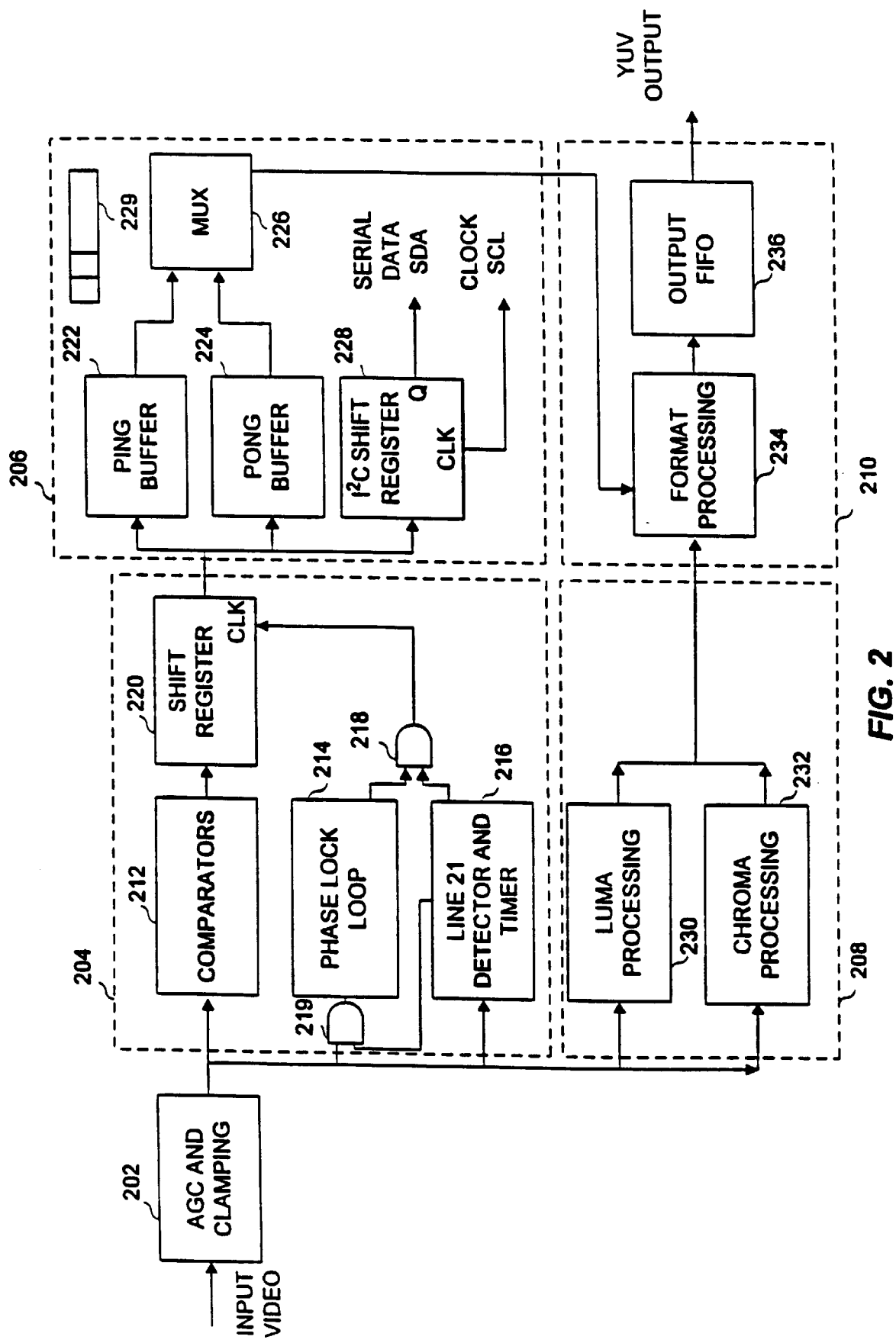
FIG. 2 is a block diagram illustrating a digitizer and decoder circuit of the graphics display system of FIG. 1.

Referring to FIG. 2, there is shown a block diagram illustrating the digitizer and decoder circuit 102, which includes an automatic gain control (AGC) and clamping circuit 202, a closed captioning decoder 204, a closed captioning processor 206, a video signal processor 208, and an output processor 210. The analog video signal is provided to the AGC and clamping circuit 202 which applies conventional automatic gain control and clamping to the received analog video signal to generate a modified video signal. This modified video signal is provided to both the closed captioning decoder 204 and the video signal processor 208.

The closed captioning decoder 204 extracts the closed caption data from the modified video signal. The closed captioning decoder 204 includes a comparator circuit 212, a phase lock loop 214, a line 21 detector and timer 216, a signal-enabling AND gate 218, an input-enabling AND gate 219, and a serial-to-parallel shift register 220. The comparator circuit 212 compares the modified video signal to predetermined values for converting the text data in the modified video signal into a digital text data stream, which is provided to the shift register 220. In the NTSC standard, digital data is amplitude modulated so that a logic "1" has an amplitude between 50 and 100 IRE, and a logic "0" has an amplitude less than 20 IRE. The comparator circuit 212 provides a digital signal having a first logic state (for example, "1") when the amplitude is greater than a predetermined threshold (for example, 50 IRE) and provides a digital signal having a second logic state (for example, "0") when the amplitude is less than the predetermined threshold. The digitizer and decoder circuit 102 preferably has a sampling rate that is higher than the closed caption data so that the larger data time of the closed caption data allows the circuit 102 to correctly sample the data. For example, the closed caption data is at approximately a 500 kHz rate or 2 $\mu$s and the sampling rate of the circuit 102 is at approximately 13.5 MHz.

The line 21 detector and timer 216 monitors the modified video signal and determines the beginning and end of line 21 of each video field. For illustrative purposes, the detector and timer 216 is described for detecting line 21. Alternatively, the detector and timer 216 may detect another line or multiple lines of a field. At the start of line 21, the line 21 detector and timer 216 provides a line 21 indication signal to enable the input AND gate 219 to provide the modified video signal to the phase lock loop 214. The line 21 detector and timer 216 also enables the signal-enabling AND gate 218. At the end of line 21, the line 21 detector and timer 216 removes the line 21 indication signal to disable the input-enabling AND gate 219. When enabled, the phase lock loop 214 locks the clock in the video signal and provides this locked clock signal to the AND gate 218, which if enabled, provides a clock signal to the shift register 220. In response to the clock signal, the shift register 220 serially shifts in the digital text data and provides the data in parallel to the closed caption processor 206.

The closed caption processor 206 buffers the closed caption data during a first field and transmits the data during the next field. The closed caption processor 206 includes a ping buffer 222, a pong buffer 224, a multiplexer 226, a I²C shift register 228, and a state register 229. The closed caption processor 206 stores the text data in the ping buffer 222 for the first field and transmits the data in the next field. Likewise, the closed caption processor 206 stores the text data in the pong buffer 224 in one field and then transmits the data in the next field. Thus, the closed caption processor alternates between the ping buffer 222 and the pong buffer 224 every odd field. The multiplexer 226 is switched every field to alternately provide the text data in the ping and pong buffers 222 and 224. Alternatively, the I²C shift register 228 provides the text data to the GUI accelerator 106. The state register 229 includes a bit that indicates that the digitizer and decoder circuit 102 is to process closed caption text, and includes a bit indicating whether the odd or even field of the video data contains closed caption text. A user may select whether the digitizer and decoder circuit 102 is to process the closed caption text. This selection sets the associated bit in the state register 229. The determination of whether closed caption data is in the odd or even field may be user selected or automated by an auto detection circuit (not shown). This indication is stored in the associated bit of the state register 229.

The video signal processor 208 provides conventional luminance and chrominance components of the video signal. The video signal processor 208 includes a luminance processor 230 for providing a luminance component of the video signal, and also includes a chrominance processor 232 for providing a chrominance component of the video signal. The video signal processor 208 provides video data in a predetermined format, such as RGB or YUV. The format of the video data is now described in a YUV format. The luminance processor 230 provides the Y component of the video data. Likewise, the chrominance processor 232 provides the UV component of the video data.

The output processor 210 formats the video data from the closed caption processor 206 and the video signal processor 208 and provides the formatted video data to the pixel bus 120. In an YUV format, the pixel bus 120 includes a Y bus (not shown) and a UV bus (not shown). The output processor 210 includes a format processor 234 and an output memory 236. The output memory 236 may be, for example, a conventional first-in-first-out (FIFO). The format processor 234 provides video data in the data format of the GUI accelerator 104 to the output FIFO 236, which provides video and text data to the GUI accelerator 104. This format may be, for example, RGB or YUV. The format processor 234 also provides the closed caption text in the same format as the video data to the output FIFO 236. In this format, the GUI accelerator 104 processes the text data without decimation of the data and with scalability of the data. The GUI accelerator 104 may be enabled to scale the data received over the pixel bus 120. During such scaling, the GUI accelerator 104 applies an interpolation to video data received in different bytes of video data. By applying this scaling, the GUI accelerator 104 generates the video signals for display in the appropriate format. Furthermore, the GUI accelerator 104 also applies this scaling to the closed caption data. The format of the closed caption data described below allows the GUI accelerator 104 to apply scaling to the closed caption data and to regenerate the closed caption data in the correct format. The scaling regenerates the closed caption data in its original format.

Figure 3A:
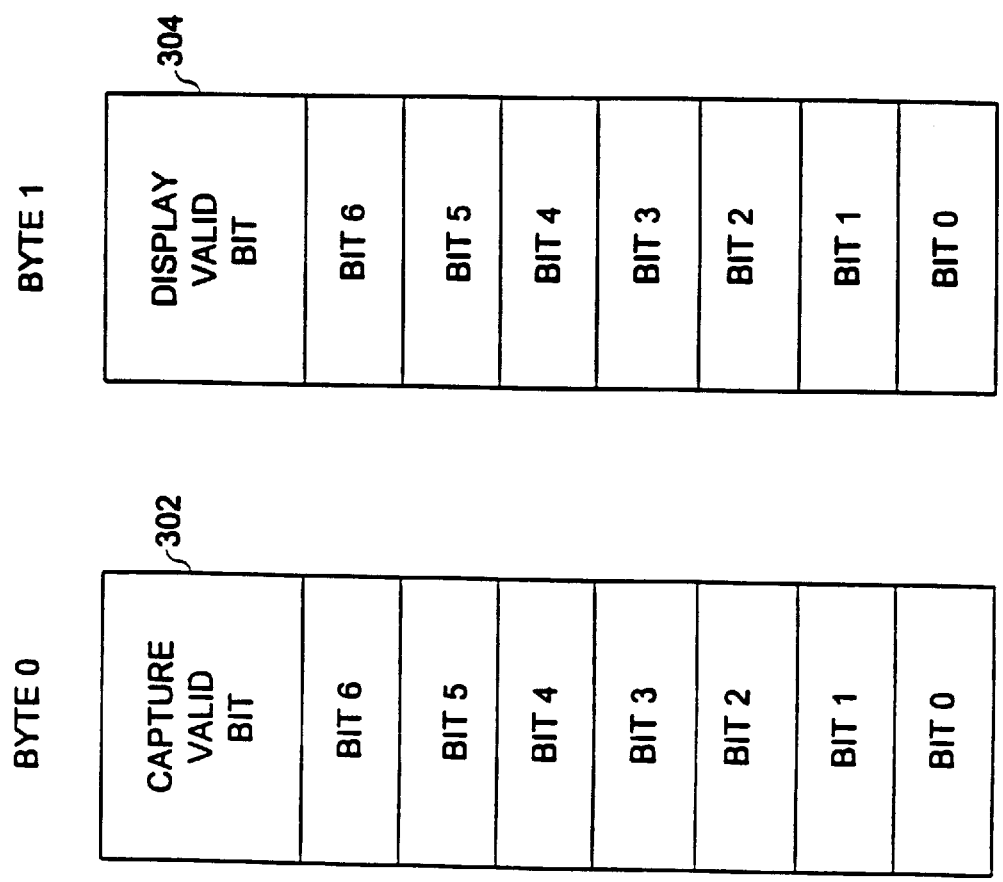

Referring to FIG. 3a, there is shown a block diagram illustrating the format of text data provided by the format processor 234 during line 21 in a YUV 4:2:2 format embodiment. A first byte of data (byte 0) includes a capture valid bit and seven bits of data, bits 0 through 6. A second byte of data (byte 1) includes a display valid bit and seven bits of data, bits 0 through 6. A third byte has the same data format as the first byte of data. A fourth byte has the same data format as the second byte of data. This pattern is repeated for subsequent bytes of data.

In a pixel bus 120 having eight bits, the output processor 210 alternately provides bytes 0 and 1 on the pixel bus 120. In a pixel bus 120 having sixteen bits, the output processor 210 provides byte 0 and byte 1 on the Y bus and the UV bus of the pixel bus 120, respectively.

Figure 5:
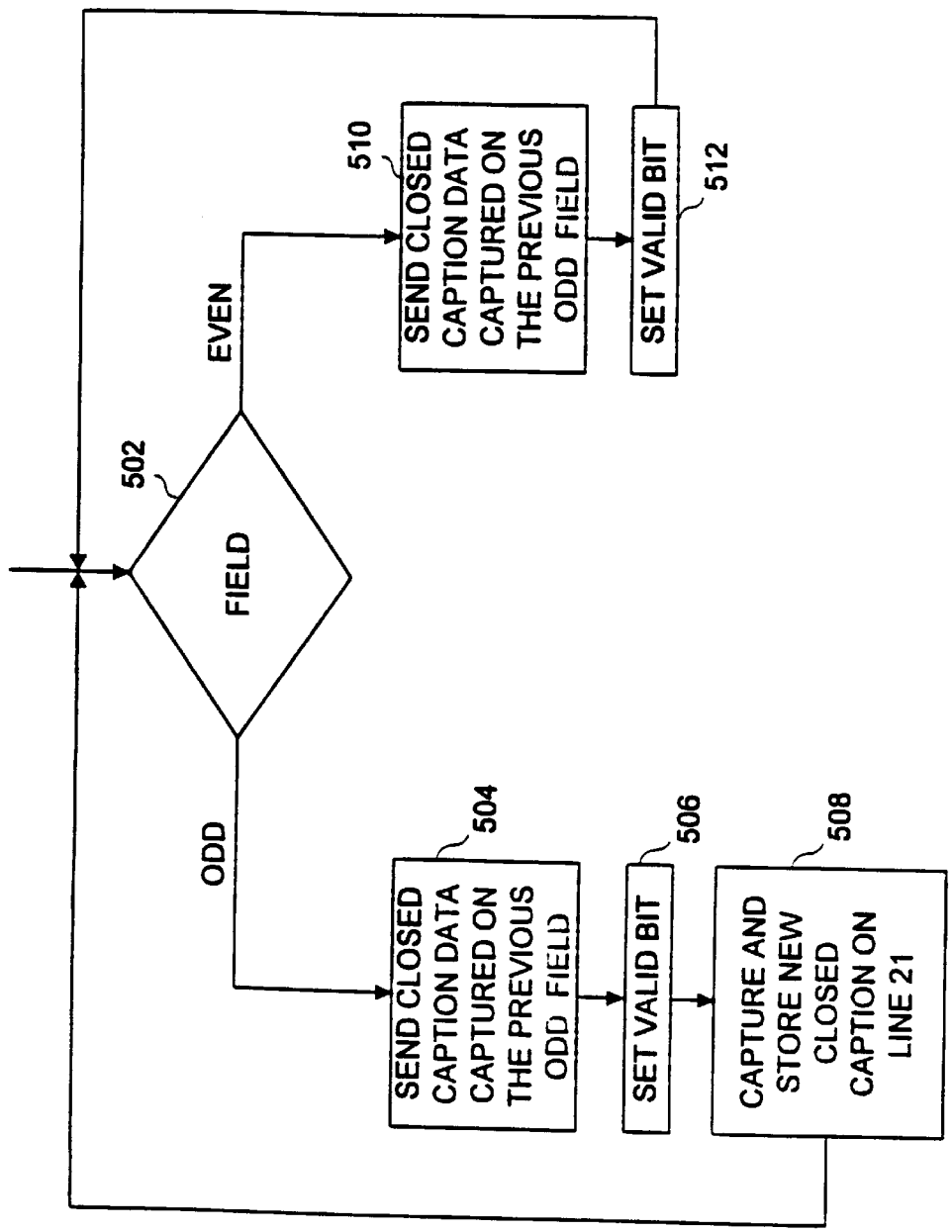
FIG. 5 is a flowchart illustrating the storing and reading of data from the ping and pong buffers in the digitizer and decoding circuit of FIG. 2.

Referring to FIG. 3b, there is shown a block diagram illustrating the format of text data provided by the format processor 234 during line 21 in a YUV 4:1:1 format embodiment. For the YUV 4:1:1 format, the format processor 234 arranges the text data in such a manner that the GUI accelerator 104 assembles the text data into the original two bytes of text data. A first byte of data (byte 0) includes a display valid bit and seven bits of data, bits 0 through 6. A second byte of data (part of byte 1) includes a capture valid bit, bit 6 of the data, a valid bit, bit 6 of the data, and four don't care (X) bits. Third, fifth, and seventh bytes each have the same data format as the first byte. A fourth byte of data (part of byte 1) includes bits 5 and 4 of the data and four don't care (X) bits as shown in FIG. 5. A sixth byte of data (part of byte 1) includes bits 3 and 2 of the data and four don't care (X) bits. Likewise, an eighth byte of data (part of byte 1) includes bits 1 and 0 of the data and four don't care (X) bits. This pattern is repeated for subsequent bytes of data.

Referring to FIGS. 4a and 4b, there are shown timing diagrams illustrating the timing of the vertical synchronization (Vsync) signal and the interrupt, respectively. The Vsync signals occur at times 401-1 through 401-7. The line 21 of the video field is received at times 402-1 through 402-7 and the text data is stored in either the ping or pong buffers 222 and 224. The text data stored in the previous field is provided to the GUI accelerator 104 in either the format of FIG. 3a or FIG. 3b. The times 402-1 through 402-2 may correspond to either odd or even video fields. For illustrative purposes, times 402-1, -3, -5, -7 correspond to odd fields, and times 402-2, -4, -6 correspond to even fields. Upon an occurrence of a Vsync signal, the interrupt signal is set. For illustrative purposes, the interrupt is set if the signal is high and the interrupt is unset or is low, when the interrupt has been serviced. For clarity, the timing is described for the capture of field 1 in the frame buffer 110.

At time 401-1, the interrupt has been serviced before the line 21 begins. The digitizer and decoder circuit 102 has not set the valid byte, and thus the GUI accelerator 104 does not read the caption data which is written at line 21.

At time 401-2, when the second field interrupt occurs, the GUI accelerator 104 reads the data from the frame buffer 110. Because the even field is not received, it does not matter for this case whether the interrupt is serviced before or after line 21. The data in the frame buffer 110 is from the previous field.

At time 401-3, the interrupt, which is set, is not serviced until the next field after time 401-4. The processing at this time is similar to the processing at times 401-1 and 401-2. The data in the frame buffer 110 is from the previous Vsync signal.

At time 401-5, the host processor 116 services the interrupt after the closed caption data is written to the frame buffer 110. The host processor 116 reads the data and resets the valid byte.

At time 401-6, the GUI accelerator 104 ignores the second interrupt because the valid byte has been reset.

Referring to FIG. 5, there is shown a flowchart illustrating the storing and reading of data from the ping and pong buffers 222 and 224. As described above, the closed captioning processor 206 alternately stores and transmits the text data in the ping and pong buffers 222 and 224. For illustrative purposes, the operation of the closed captioning processor 206 is described for capturing closed caption data in odd fields. Alternatively, the capture may occur during even fields.

If 502, the field is an odd field, the ping buffer 222 provides 504 the closed caption data captured on the previous odd field to the output processor 210 to be provided to the GUI accelerator 106 for storage in the frame buffer. The format processor 234 sets 506 the valid bit. Here the valid bit is set to '1'. The closed caption data of line 21 of the current video field is captured and stored in the pong buffer 224.

If 509 the field is an even field, the ping buffer 222 provides 510 the closed caption data captured on the previous odd field to the output processor 210. The format processor 234 sets 512 the valid bit. The closed caption data from the previous field also is provided during the even field so that the GUI accelerator 104 receives valid data independent of the timing relationship between the Vsync signal and the interrupt as described above in conjunction with FIG. 4.

During the next odd and even field pair, the process is repeated except that the closed caption data from the previous video field is provided from the pong buffer 224 and the closed caption data from the current video field is captured in the ping buffer 222.

Figure 6:
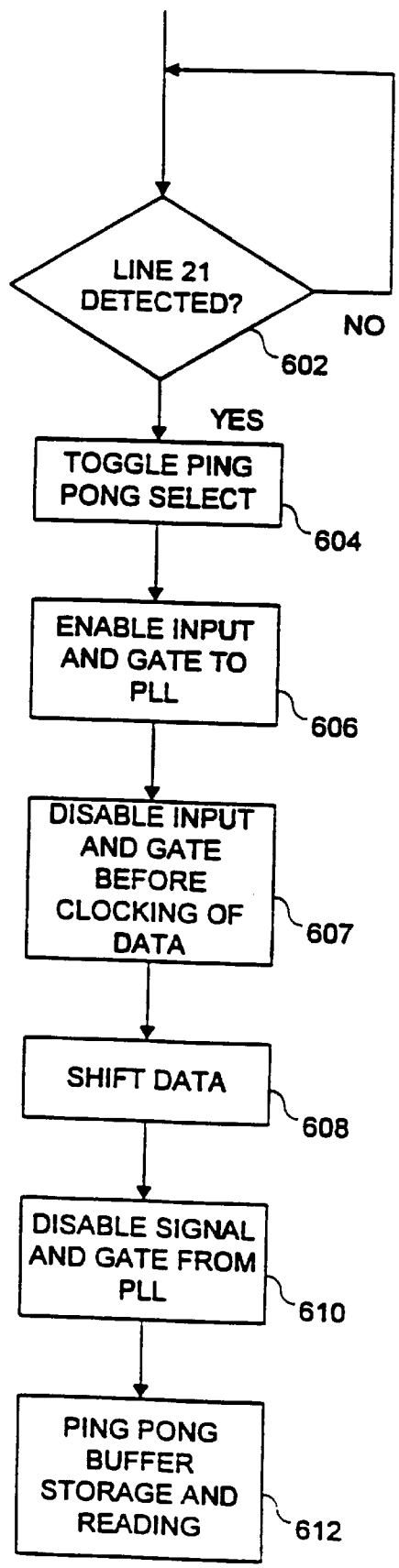
FIG. 6 is a flowchart illustrating the operation of a closed caption decoder and a closed caption processor of the digitizer and decoder circuit of FIG. 2.

Referring to FIG. 6, there is shown a flow chart illustrating the operation of the closed caption decoder 204 and the closed caption processor 206. Upon detection 602 of line 21, the selection of the ping buffer 222 and the pong buffer 224 is toggled 604. The line 21 detector 216 enables 606 the input-enabling AND gate 219 to provide the modified video signal to the phase lock loop 214 and enables the signal-enabling AND gate 218 to provide the clocked signal to the shift register 220. The detector 216 disables 607 the input-enabling AND gate 219 after a predetermined time. The predetermined time may be, for example, 7 clocks or 14 $\mu$s in an NTSC system. The shift register 220 is clocked to shift 608, the text data therein. After a predetermined time, the line 21 detector 216 disables 610 the signal-enabling AND gate to decouple the phase lock loop 214 from the shift register 220 to stop clocking of data by the shift register 220. The text is stored 612 and read from the ping and pong buffers 222 and 224 as described above.

Figure 7:
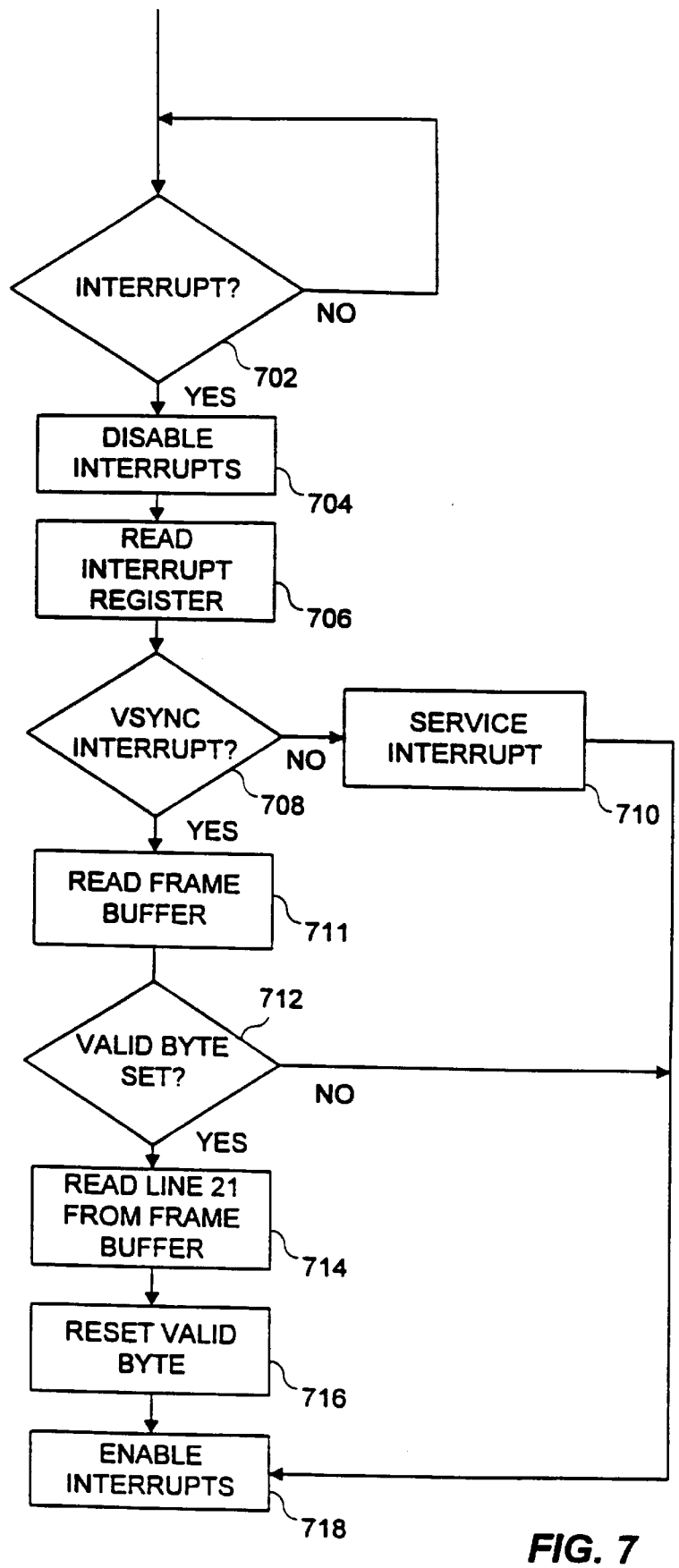
FIG. 7 is a flowchart illustrating the servicing of a Vsync interrupt.

Referring to FIG. 7, there is shown a flowchart illustrating the servicing of a Vsync interrupt. In response 702 to an interrupt, the host processor 116 disables 704 interrupts until it completes servicing the interrupt. The host processor 116 reads 706 an interrupt request register (not shown) of the host processor 116 to determine 708 the type of interrupt received. If the interrupt is not a Vsync interrupt, the host processor 116 appropriately services 710 the interrupt. The servicing of interrupts other than the Vsync interrupt are well-known and thus a description of such other interrupts is not necessary for describing or understanding the invention.

On the other hand, if the interrupt is a Vsync interrupt, the host processor 116 reads 711 the frame buffer 110 and determines 712 whether the valid bit is set, or for the described format, whether the valid bit is '1'. A set noted bit indicates the data is valid caption data. When the valid bit is set, the host processor 116 reads 714 line 21 from the frame buffer 110 and resets 716 the valid bit, or for the described format, sets the valid bit to '0'. The host processor 116 enables 718 the interrupts.

If the valid byte is not set 712, the host processor 116 does not service the Vsync interrupt and enables 718 the interrupts.

Figure 8:
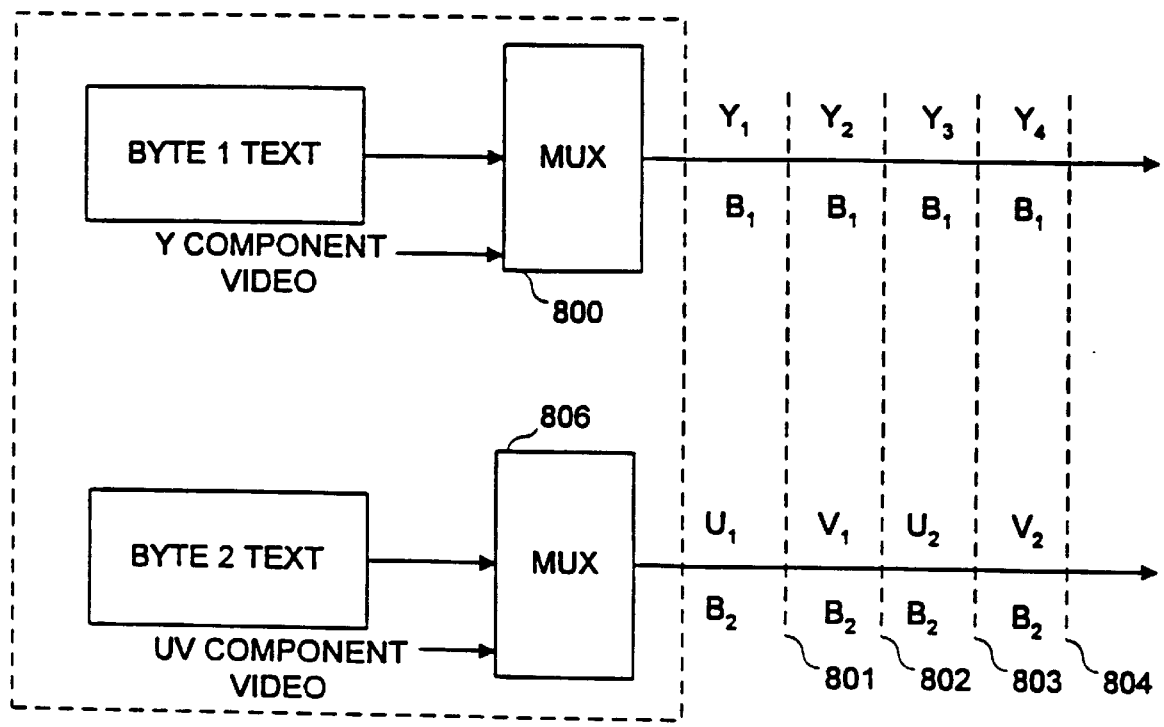
FIG. 8 is a block diagram illustrating the format processor of the digitizer and decoder circuit of FIG. 2 and the arrangement of the closed caption data in a YUV video format by the format processor on a YC bus.

Referring to FIG. 8, there is shown a a block diagram illustrating the format processor 234 of the digitizer and decoder circuit 102 and the arrangement of the closed caption data in a YUV video format by the format processor 234. The format processor 234 includes a multiplexer 800 for providing either the Y component of the video data from the video signal processor 208 or the first byte of text data from the closed captioning processor 206. The multiplexer 800 provides the Y component of data as a sequence of $Y_1$, $Y_2$, $Y_3$, and $Y_4$ for clocks 801, 802, 803, and 804, respectively. At the time of the video signal that includes the text data (line 21 for closed caption data), the multiplexer 800 provides the first byte of data $B_1$, for each of the clocks 801, 802, 803, and 804.

Likewise, the format processor 234 also includes a multiplexer 806 for providing either the UV components of the video data from the video signal processor 208 or the second byte of text data from the closed captioning processor 206. The multiplexer 802 provides the UV components of data as a sequence of $U_1$, $V_1$, $U_2$, $V_2$ for clocks 801, 802, 803, and 804. At the time of the video signal that includes the text data (line 21 for closed caption data), the multiplexor 806 provides the second byte of data $B_2$, for each of the clocks 801, 802, 803, and 804.

The GUI accelerator 104 applies YUV weighting to the data received by the GUI accelerator 104. With this data arrangement, when the received data is the text data, the same text data is received during the clocks 801, 802, 803, and 804. The scaling applied by the GUI accelerator 104 accordingly reproduces the text data. If the data is scaled, the text data provided by the GUI accelerator 104 is the same as provided by the digitizer and decoder circuit 102. Thus, the format processor 234 formats the data so that after the GUI accelerator 106 assembles the data the original two bytes of text data are returned. Alternatively, the scaling may be disabled.

Therefore, the graphics display system processes the closed caption data for capture or display, which is indicated in the caption data provided by the digitizer and decoder circuit to the GUI accelerator. The GUI accelerator generates an interrupt based on the vertical synchronization signal in the video signal. The host processor services the interrupt to control the processing of the text data for display or storage and clears the interrupt by clearing a valid bit in the digitizer and decoder circuit via the I$^2$C bus. The digitizer and decoder circuit formats the text data so that the GUI accelerator processes the data as it does the video signal for storage in the disk or frame buffer.

We claim:

1. A method for processing closed caption data, the method comprising the steps of:

detecting closed caption data in one of two video fields of a first video frame;

storing the detected closed caption data from said one video field;

responsive to a signal having a first logic state during the first of the two video fields, retrieving during the first of the two video fields stored closed caption data from a video field of a previous video frame; and, responsive to the signal having a second logic state during the first of the two video fields, retrieving during the second of the two video fields stored closed caption data from a video field of the previous video frame.

2. The method of claim 1 further comprising the step of adding an indicator to the transmitted closed caption data indicative of whether the closed caption data is valid.

3. The method of claim 2 wherein the indicator further is indicative of whether the closed caption data is to be displayed.

4. The method of claim 2 wherein the indicator further is indicative of whether the closed caption data is to be captured.

5. The method of claim 1 wherein the retrieved closed caption data is unscaled.

6. The method of claim 1 where in the detecting and storing steps are performed simultaneously.

7. The method of claim 1 where in the detecting and storing steps are performed independently.

8. A digitizer and decoder circuit for processing text data encoded in a video signal, the digitizer and decoder circuit comprising:
   a detector for providing a text data indicator signal having a first logic state indicative of the occurrence of the text data and having a second logic state indicative of the no text data;
   a first buffer for storing text data in one of two fields of a first frame of the video signal;
   a second buffer for storing text data in one of two fields of a second frame of the video signal; and
   a processor coupled to the first and second buffers and to the detector for providing the video signal in response to the text data indicator signal being in the second logic state and for alternately providing the stored text data in the first and second buffers responsive to the text data indicator signal being in the first logic state,
   wherein, the first buffer is configured to provide to the processor the stored text data during the first field of the two fields of the first frame in response to the availability of the processor during the first field, and to provide the text data during a second field in response to the unavailability of the processor during the first field.

9. The circuit of claim 8 wherein the processor provides the stored text data in the first buffer during said two fields of the second frame and provides the stored text data in the second buffer during said two fields of the first frame.

10. The circuit of claim 8 wherein the processor adds an indicator to the text data indicative of whether the text data is valid.

11. The circuit of claim 10 wherein the indicator further is indicative of whether the text data is to be displayed.

12. The circuit of claim 10 wherein the indicator further is indicative of whether the text data is to be captured.

13. The circuit of claim 8 wherein the text data is unscaled.

14. A graphics display system comprising:
   a graphics display;
   a digital-to-analog converter coupled to the graphics display for generating an analog graphics signal responsive to a digital graphics signal;
   a frame buffer;
   a GUI accelerator coupled to the digital graphics signal for providing the digital graphics signal and for providing closed caption text to the frame buffer; and
   a digitizer and decoder circuit coupled to the GUI accelerator for receiving an analog video signal containing closed caption text, for generating a digital video signal that includes closed caption text, for storing closed caption text from a first field of a current frame of the video signal, for providing, in response to the availability of the GUI accelerator during the first field, the closed caption text of a previous frame during the first field, and for providing, in response to the unavailability of the GUI accelerator during the first field, the closed caption text of a previous frame during a second field.

15. The system of claim 14 wherein the digitizer and decoder circuit adds an indicator to the text data indicative of whether the text data is valid.

16. The system of claim 15 wherein the indicator further is indicative of whether the text data is to be displayed.

17. The system of claim 15 wherein the indicator further is indicative of whether the text data is to be captured.

18. The graphics display system of claim 17 further comprising:
   a disk coupled to the GUI accelerator for storing the text data if the indicator indicates that the text data is to be captured.

19. The graphics display system of claim 15 wherein the GUI accelerator generates a synchronization interrupt responsive to a vertical synchronization signal from the digitizer and decoder circuit, and the system further comprises a host processor that commands the GUI accelerator to read the text data from the frame buffer responsive to the synchronization interrupt and the indicator indicating the data is valid.

20. The graphics display system of claim 14 wherein the text data is unscaled.

21. The graphics display system of claim 14 wherein the digitizer and decoder circuit comprises:
   a detector for providing a text data indicator signal having a first logic state indicative of the occurrence of the text data and having a second logic state indicative of the no text data;
   a first buffer for storing text data in one field of a first frame of the video signal;
   a second buffer for storing text data in one field of a second frame of the video signal; and
   a processor coupled to the first and second memories and to the detector for providing the video signal in response to the text data indicator signal being in the second logic state and for alternately providing the stored text data in the first and second memories responsive to the text data indicator signal being in the first logic state.

22. The system of claim 21 wherein the digitizer and decoder circuit adds an indicator to the text data indicative of whether the text data is valid.

23. The graphics display system of claim 22 wherein the GUI accelerator generates a synchronization interrupt responsive to a vertical synchronization signal from the digitizer and decoder circuit, and the system further comprises a host processor that commands the GUI accelerator to read the text data from the frame buffer responsive to the synchronization interrupt and the indicator indicating the data is valid.

24. A graphics display system comprising:
   a graphics display;
   a frame buffer for storing graphics data and text data;
   a decoder having an input for receiving an analog video signal containing text data and having an output for providing graphics data and text data extracted from the analog video signal; and a GUI accelerator having an input coupled to the decoder for receiving the graphics data and text data and having a first output coupled to the graphics display for providing graphics data and text data thereto, and having a second output coupled to the frame buffer for providing the graphics data and the text data, wherein, the decoder is configured to provide the text data during the first field in response to the availability of the GUI accelerator during the first field, and to provide the text data during a second field in response to the unavailability of the GUI accelerator during the first field.

25. The graphics display system of claim 24 wherein the analog video signal contains the text data in a line of a vertical blanking interval of a field.

26. The graphics display system of claim 24 further comprising a storage medium for capturing the text data.

* * * * *